US012770155B2

(12) United States Patent
Patel et al.

(10) Patent No.: US 12,770,155 B2
(45) Date of Patent: Oct. 20, 2026

(54) DETERMINING MORE ACCURATE LABELS FOR NODES IN A GRAPH

(71) Applicant: MASTERCARD TECHNOLOGIES CANADA ULC, Vancouver (CA)

(72) Inventors: Rajat Gajendrakumar Patel, Ahmedabad (IN); Aakarsh Malhotra, New Delhi (IN); Sudipta Modak, Windsor (CA); Yerramsetty L N Siddhard, Guntur District (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 58 days.

(21) Appl. No.: 18/425,153

(22) Filed: Jan. 29, 2024

(65) Prior Publication Data

US 2025/0245677 A1 Jul. 31, 2025

(51) Int. Cl.

| | |
|---|---|
| ***G06Q 30/01*** | (2023.01) |
| ***G06F 17/16*** | (2006.01) |
| ***G06N 20/20*** | (2019.01) |
| ***G06Q 30/018*** | (2023.01) |

(52) U.S. Cl.

CPC ......... *G06Q 30/0185* (2013.01); *G06F 17/16* (2013.01); *G06N 20/20* (2019.01)

(58) Field of Classification Search

None

See application file for complete search history.

(56) References Cited

U.S. PATENT DOCUMENTS

| | | | |
|---|---|---|---|
| 10,769,766 B1 | 9/2020 | Padfield et al. | |
| 11,531,852 B2 | 12/2022 | Vahdat | |
| 2019/0122149 A1* | 4/2019 | Caldera | H04L 63/102 |

(Continued)

FOREIGN PATENT DOCUMENTS

| | | | |
|---|---|---|---|
| WO | WO-2024107587 A1 * | 5/2024 | G06N 3/0895 |

OTHER PUBLICATIONS

Kishan, S., et al., "Fraud Detection in Banking Transactions Using Ensemble Learning", 2023 IEEE Fifth International Conference on Advances in Electronics, Computers and Communications (ICAECC). (Year: 2023).*

(Continued)

*Primary Examiner* — Clay C Lee

(74) *Attorney, Agent, or Firm* — Michael Best & Friedrich LLP

(57) ABSTRACT

A system for determining more accurate labels for nodes in a graph. The system includes an electronic computing device. The electronic computing device includes an electronic processor. The electronic processor is configured to receive a graph including a plurality of nodes linked by one or more connections. The electronic processor is also configured to augment the graph by creating one or more new connections in the graph. For each node of the plurality of nodes included in the augmented graph, the electronic processor is configured to, using a first machine learning model, determine a first vector associated with the node based on the augmented graph, using a second machine learning model, determine a second vector associated with the node based on the augmented graph, and determine the more accurate label for the node based on the first vector and the second vector.

12 Claims, 9 Drawing Sheets

(56) References Cited

U.S. PATENT DOCUMENTS

| | | | | |
|---|---|---|---|---|
| 2019/0377819 | A1* | 12/2019 | Filliben | G06N 3/045 |
| 2020/0184268 | A1* | 6/2020 | Lewis | G06N 20/00 |
| 2022/0070292 | A1* | 3/2022 | Casal | H04M 3/2281 |
| 2024/0112015 | A1* | 4/2024 | Inzelberg | G06N 3/045 |
| 2024/0371480 | A1* | 11/2024 | Frieder | G16H 10/60 |
| 2025/0068941 | A1* | 2/2025 | Zheng | G06N 3/045 |
| 2025/0173738 | A1* | 5/2025 | Bitaab | G06Q 30/0185 |

OTHER PUBLICATIONS

Zhang, M.-L. et al. 2016. Partial label learning via feature-aware disambiguation. In ACM SIGKDD international conference on knowledge discovery and data mining, 1335-1344.

Zhang, M.-L. et al. 2017. Disambiguation-free partial label learning. IEEE Transactions on Knowledge and Data Engineering, 29, 10, 2155-2167.

Zhou Y. et al. 2018. Geometric mean metric learning for partial label data. Neurocomputing, 275, 394-402.

Zhou Z.-H.. 2018. A brief introduction to weakly supervised learning. National science review, 5, 1, 44-53.

Chen, Z., et al. "Knowledge graph completion: A review." Ieee Access 8 (2020): 192435-192456.

Cosmo, L., et al. "Latent-graph learning for disease prediction." Medical Image Computing and Computer Assisted Intervention—MICCAI 2020: 23rd International Conference, Lima, Peru, Oct. 4-8, 2020, Proceedings, Part II 23. Springer International Publishing, 2020 (1-11).

Dai, E. et al. "Nrgnn: Learning a label noise resistant graph neural network on sparsely and noisily labeled graphs." Proceedings of the 27th ACM SIGKDD conference on knowledge discovery & data mining. 2021 (10 pages).

De Aquino Afonso, B. K., et al. "Analysis of label noise in graph-based semi-supervised learning." Proceedings of the 35th Annual ACM Symposium on Applied Computing. 2020 (8 pages).

Deng, L .. "The mnist database of handwritten digit images for machine learning research [best of the web]." IEEE signal processing magazine 29.6 (2012): 141-142.

Du, X., et al. "Noise-robust graph learning by estimating and leveraging pairwise interactions." arXiv preprint arXiv:2106.07451 (2021) (24 pages).

Dua, D. et al. 2017. UCI machine learning repository. (2017). http://archive.ics.uci.edu/ml (3 pages).

Fan, J., et al. "GraphDPI: Partial label disambiguation by graph representation learning via mutual information maximization." Pattern Recognition 134 (2023): 109133.

Fan, J., et al. "Partial label learning based on disambiguation correction net with graph representation." IEEE Transactions on Circuits and Systems for Video Technology 32.8 (2021): 4953-4967.

Fatemi, B. et al. "Slaps: Self-supervision improves structure learning for graph neural networks." Advances in Neural Information Processing Systems 34 (2021): 22667-22681.

Feng, L., et al. "Provably consistent partial-label learning." Advances in neural information processing systems 33 (2020): 10948-10960.

Feng, L., et al. (Jul. 2018). Leveraging Latent Label Distributions for Partial Label Learning. In IJCAI (pp. 2107-2113).

Giles, C.L et al. 1998. Citeseer: an automatic citation indexing system. In Proceedings of the third ACM conference on Digital libraries, 89-98.

Gong, X. et al. 2021. Generalized large margin • -NN for partial label learning. IEEE Transactions on Multimedia, 24, 1055-1066.

Hüllermeier E. et al. 2005. Learning from ambiguously labeled examples. In Advances in Intelligent Data Analysis VI: 6th International Symposium on Intelligent Data Analysis, IDA 2005, Madrid, Spain, Sep. 8-10, 2005. Proceedings 6. Springer, 168-179 (33 pages).

Jin, W., et al. "Graph structure learning for robust graph neural networks." Proceedings of the 26th ACM SIGKDD international conference on knowledge discovery & data mining. 2020 (9 pages).

Kingma, D. P., et al. (2014). Adam: A method for stochastic optimization. arXiv preprint arXiv:1412.6980 (15 pages).

Krizhevsky, A. et al. 2009. Learning multiple layers of features from tiny images. Master's thesis, University of Toronto (2009) (60 pages).

Li, Y. et al. "Unified robust training for graph neural networks against label noise." Pacific-Asia Conference on Knowledge Discovery and Data Mining. Cham: Springer International Publishing, 2021 (13 pages).

Lin, G., et al. "Partial label learning based on label distributions and error-correcting output codes." Soft Computing 25 (2021): 1049-1064.

Liu, L. et al. "A conditional multinomial mixture model for superset label learning." Advances in neural information processing systems 25 (2012) (9 pages).

Lv, J., et al. "Progressive identification of true labels for partial-label learning." International conference on machine learning. PMLR, 2020 (11 pages).

Lyu, G. et al. "Deep Graph Matching for Partial Label Learning." IJCAI. 2022 (7 pages).

Lyu, G. et al. 2023. Prior knowledge constrained adaptive graph framework for partial label learning. ACM Transactions on Intelligent Systems and Technology, 14, 2, 1-16.

Lyu, G., et al. (2019). GM-PLL: Graph Matching based Partial Label Learning. arXiv e-prints, arXiv-1901 (12 pages).

Malach, E. et al. 2017. Decoupling "when to update" from"how to update". Advances in neural information processing systems, 30 (11 pages).

Mccallum, A. K., et al. (2000). Automating the construction of internet portals with machine learning. Information Retrieval, 3, 127-163.

Mcpherson, M. et al. "Birds of a feather: Homophily in social networks." Annual review of sociology 27.1 (2001): 415-444.

Mernyei P. et al. 2020. Wiki-cs: a wikipedia-based benchmark for graph neural networks. arXiv preprint arXiv:2007.02901 (7 pages).

Mikolov, T. et al. 2013. Distributed representations of words and phrases and their compositionality. Advances in neural information processing systems, 26 (9 pages).

Modak, S. et al. 2023. Applications of deep learning in disease diagnosis of chest radiographs: a survey on materials and methods. Biomedical Engineering Advances, 100076.

Nguyen N. et al. 2008. Classification with partial labels. In ACM SIGKDD international conference on Knowledge discovery and data mining, 551-559.

Qian, S., et al. "Robust training of graph neural networks via noise governance." Proceedings of the Sixteenth ACM International Conference on Web Search and Data Mining. 2023 (1-9).

Sun, K. et al. 2020. Pp-pll: probability propagation for partial label learning. In ECML PKDD Machine Learning and Knowledge Discovery in Databases. Springer, 123-137.

Tian, Y. et al. 2023. Partial label learning: taxonomy, analysis and outlook. Neural Networks 161, 708-734.

Velickovic, P. et al. 2017. Graph attention networks. stat, 1050, 20, 10-48550.

Wang, H. et al. 2022. Solar: sinkhorn label refinery for imbalanced partial-label learning. arXiv preprint arXiv:2209.10365 (20 pages).

Wang, H., et al. "Pico: Contrastive label disambiguation for partial label learning." International Conference on Learning Representations. 2021 (18 pages).

Wen, H. et al. 2021. Leveraged weighted loss for partial label learning. In International Conference on Machine Learning, 11091-11100.

Wu, D.-D. et al. 2022. Revisiting consistency regularization for deep partial label learning. In International Conference on Machine Learning, 24212-24225.

Wu, Z. et al. 2020. A comprehensive survey on graph neural networks. IEEE transactions on neural networks and learning systems, 32, 1, 4-24.

Xia, S. et al. 2022. Ambiguity-induced contrastive learning for instance-dependent partial label learning. In International Joint Conference on Artificial Intelligence, 3615-3621.

Xie M.-K. et al. 2018. Partial multi-label learning. In AAAI Conference on Artificial Intelligence No. 1. vol. 32 (8 pages).

(56) References Cited

OTHER PUBLICATIONS

Xu, K. et al. 2018. How powerful are graph neural networks? arXiv preprint arXiv:1810.00826 (17 pages).
Xu, N. et al. 2019. Partial label learning via label enhancement. In AAAI Conference on Artificial Intelligence No. 01. vol. 33, 5557-5564.
Xu, N. et al. 2021. Instance-dependent partial label learning. Advances in Neural Information Processing Systems, 34, 27119-27130.
Yan Y. et al. 2020. Partial label learning with batch label correction. In AAAI conference on artificial intelligence No. 04. vol. 34, 6575-6582.
Yan Y. et al. 2023. Mutual partial label learning with competitive label noise. In International Conference on Learning Representations (14 pages).
Yu F. et al. 2016. Maximum margin partial label learning. In Asian conference on machine learning, 96-111.
Zhang, F. et al. "Exploiting class activation value for partial-label learning." International conference on learning representations. 2021 (17 pages).
International Search Report and Written Opinion for Application No. PCT/CA2025/050105 dated May 16, 2025 (10 pages).
Xia, J., et al. "Progcl: Rethinking hard negative mining in graph contrastive learning." arXiv preprint arXiv:2110.02027 (2021), 15 pages.
Mohammed, A. et al. "A comprehensive review on ensemble deep learning: Opportunities and challenges." Journal of King Saud University-Computer and Information Sciences 35.2 (2023): 757-774.

* cited by examiner

700

FIG. 7

| Dataset | Model | Uniform Label Noise | | | Competitive Label Noise | | |
|---|---|---|---|---|---|---|---|
| | | $p_{noise}$ | | | No. of Classes | | |
| | | **0.2** | **0.3** | **0.4** | **2** | **3** | **4** |
| Cora | PL-KNN | 31.84 ± 0.2 | 29.88 ± 0.2 | 29.77 ± 0.4 | 27.41 ± 0.2 | 26.86 ± 0.5 | 19.57 ± 1.2 |
| | DGAP | 36.48 ± 0.7 | 33.43 ± 0.9 | 32.91 ± 0.6 | 34.69 ± 0.6 | 30.16 ± 1.1 | 22.77 ± 2.8 |
| | PRODEN-MLP | 43.08 ± 0.2 | 39.84 ± 0.2 | 35.11 ± 0.4 | 47.58 ± 0.3 | 31.04 ± 0.8 | 21.03 ± 2.4 |
| | PRODEN-GCN | 83.45 ± 0.3 | 81.58 ± 0.3 | 78.77 ± 0.4 | 78.42 ± 0.5 | 61.50 ± 1.1 | 26.66 ± 1.8 |
| | CAVL-MLP | 47.13 ± 1.2 | 46.12 ± 1.5 | 42.15 ± 1.8 | 43.31 ± 1.8 | 25.05 ± 1.9 | 17.40 ± 3.2 |
| | CAVL-GCN | 69.81 ± 0.9 | 69.22 ± 1.2 | 62.12 ± 1.9 | 65.29 ± 0.6 | 53.39 ± 1.3 | **43.61±3.6** |
| | PLD-Graph | **84.63±0.2** | **84.15±0.5** | **83.41±0.6** | **82.37±0.4** | **75.02±0.7** | 39.45 ± 2.8 |
| | GCN (Fully Supervised) | 85.41 ± 0.2 | | | | | |
| Citeseer | PL-KNN | 23.76 ± 0.2 | 25.53 ± 0.4 | 22.64 ± 0.5 | 24.59 ± 0.2 | 31.84 ± 0.7 | 16.27 ± 1.5 |
| | DGAP | 26.18 ± 0.9 | 25.83 ± 1.1 | 23.97 ± 0.9 | 28.41 ± 2.1 | 27.23 ± 2.5 | 19.26 ± 1.2 |
| | PRODEN-MLP | 46.22 ± 0.4 | 42.51 ± 0.5 | 37.74 ± 0.5 | 45.93 ± 0.8 | 28.95 ± 1.1 | 18.87 ± 2.2 |
| | PRODEN-GCN | 69.10 ± 0.2 | 68.86 ± 0.5 | 67.98 ± 0.6 | 67.51 ± 1.8 | 56.89 ± 2.8 | 30.90 ± 3.4 |
| | CAVL-MLP | 48.76 ± 0.8 | 39.68 ± 1.2 | 39.46 ± 1.4 | 47.05 ± 1.5 | 34.43 ± 1.9 | 15.21 ± 2.2 |
| | CAVL-GCN | 57.72 ± 0.3 | 55.25 ± 0.8 | 52.59 ± 1.2 | 60.67 ± 0.9 | 45.99 ± 2.3 | 35.85 ± 2.2 |
| | PLD-Graph | **73.80±0.3** | **73.12±0.4** | **72.48±0.6** | **72.83±0.8** | **69.78±0.6** | **37.69±3.1** |
| | GCN (Fully Supervised) | 74.96 ± 0.3 | | | | | |
| Wiki-CS | PL-KNN | 61.41 ± 0.1 | 58.87 ± 0.2 | 55.25 ± 0.4 | 60.73 ± 0.3 | 51.91 ± 1.2 | 43.11 ± 1.7 |
| | DGAP | 62.69 ± 0.2 | 60.35 ± 0.6 | 57.33 ± 1.8 | 61.12 ± 1.0 | 52.76 ± 1.4 | 44.28 ± 2.2 |
| | PRODEN-MLP | 63.10 ± 0.2 | 61.43 ± 0.3 | 56.60 ± 0.6 | 61.78 ± 0.8 | 39.94 ± 1.6 | 25.24 ± 2.9 |
| | PRODEN-GCN | 75.42 ± 0.6 | 71.26 ± 0.8 | 65.20 ± 1.1 | 66.10 ± 1.2 | 52.86 ± 1.8 | 36.42 ± 2.1 |
| | CAVL-MLP | 52.83 ± 0.6 | 43.62 ± 1.4 | 39.92 ± 1.0 | 40.39 ± 1.8 | 38.91 ± 3.2 | 27.93 ± 2.4 |
| | CAVL-GCN | 71.69 ± 0.4 | 68.83 ± 0.7 | 62.07 ± 1.8 | 69.30 ± 0.8 | 55.63 ± 1.5 | 44.46 ± 2.3 |
| | PLD-Graph | **79.51±0.3** | **78.38±0.4** | **77.16±0.7** | **78.49±0.5** | **67.92±0.7** | **45.27±1.9** |
| | GCN (Fully Supervised) | 80.67 ± 0.6 | | | | | |

DETERMINING MORE ACCURATE LABELS FOR NODES IN A GRAPH

FIELD

The implementations described herein relate to determining more accurate labels for data that is either unlabeled or associated with multiple labels. The more accurately labeled data may be used to determine whether a transaction is associated with a type of fraud.

BACKGROUND

Graph data structures model relationships amongst different entities within a dataset. Graphs can be used to represent citation data, social networks, and the like. Graph data is used to predict relationships between entities, attributes associated with entities, and classes that entities belong to. FIG. 1 provides an example of a graph data structure 100. In FIG. 1, a first node 105 represents a first entity and is associated with a first plurality of features. For example, the first entity may be a web page and the first plurality of features may include the web address associated with the web page, a title of the webpage, and an author of the web page. The first node 105 is connected, by a connection 115, to a second node 110 that represents a second entity and is associated with a second plurality of features. The connection 115 represents a relationship between the first entity and the second entity. For example, if the first entity is a first webpage and the second entity is a second webpage, the connection 115 may represent that the first webpage includes a link to the second webpage.

In the past few years, Graph Neural Networks (GNN) have demonstrated promising capabilities in modeling graph data, however GNNs, like other deep learning architectures, rely heavily on labeled data for training. Unfortunately, datasets with abundant labeled instances are scarce and expensive to compile and obtaining a large amount of correct or accurately labeled training data is challenging, time-consuming, and costly. Additionally, training datasets for graph data are usually incomplete, many nodes are not associated with labels, and many nodes are associated with multiple labels even though there is only one correct or accurate label for the node (in other words, the nodes are ambiguously or partially labeled). Ambiguously labeled nodes are particularly common when crowd-sourced annotation is utilized.

FIG. 2 provides an example illustration of how a node comes to be ambiguously labeled when crowd-sourced annotation is utilized. In FIG. 2, a first annotator 200 labels an image of a jaguar 205 (an entity represented by a node) as a leopard, a second annotator 210 labels the image of jaguar 205 as a jaguar, a third annotator 215 labels the image of the jaguar 205 as a jaguar, and a fourth annotator 220 may label the image of the jaguar 205 as a cheetah. A node that is included in a graph and represents the image of jaguar 205 will therefore be associated with a candidate label set including the labels "jaguar," "leopard," and "cheetah."

SUMMARY

Learning with ambiguous labels can be categorized into (i) inexact supervision and (ii) inaccurate supervision. With respect to inaccurate supervision, a label associated with a datapoint (a node) may be incorrect. With respect to inexact supervision, multiple labels are associated with a data point (a node) and some of the labels associated with the datapoint are incorrect. Inexact supervision where only one label is correct or accurate among the multiple provided labels included in a candidate label set for an entity is known as partial label learning (PLL). The main objective in PLL is to disambiguate entities included in, for example, a set of training data by identifying the correct or more accurate label from the set of candidate labels. There are two categories of PLL disambiguation techniques: (1) averaging disambiguation (AD) and (2) identification disambiguation (ID). In AD, equal weight is assigned to all candidate labels included in a candidate label set and a mean of a learning model's output is calculated to determine the more accurate label in the candidate label set. In contrast, in ID, the ground truth is treated as an embedded implicit variable, an objective function is maximized iteratively, and confidence estimates determined for each label are used to determine the more accurate label in the candidate label set. However, AD and ID techniques often fail to effectively determine the more accurate label due to label uncertainty in the features of the models that these techniques employ. Existing PLL approaches face limitations when scaling to large datasets or high-dimensional features and have focused on tabular data. The PLL framework has not been applied to graph datasets.

Learning methods such as inexact supervision and inaccurate supervision allow predictive models to be trained despite ambiguous labeled training data, thereby relieving the burden of extensive data annotation. Learning in the presence of single-label noise (under the umbrella of inaccurate supervision) in graph data has been studied in recent years. However, a solution is still needed to address the inexact supervision problem in graph data structures.

Therefore, implementations described herein provide systems and methods for implementing partial label learning in graphs. The implementations described herein specifically focus on sparse graphs. In sparse graphs, only a subset of the nodes included in a graph are associated with a candidate label set. Implementations described herein augment a graph by adding new connections or links to a graph using a link prediction GNN to connect similar labeled and unlabeled nodes. Augmenting the graph mitigates the sparsity issue and allows for greater accuracy in determining the more accurate label associated with a node. A pair of peer GNNs are applied on the augmented graph to determine a more accurate label associated with a node. Applying two GNNs to the augmented graph instead of a single GNN, prevents the GNNs from overfitting to noisy patterns, especially during early epochs of training. Additionally, the performance of the first machine learning model and the second machine learning model (the pair of peer GNNs) is enhanced through a training process which utilizes a pseudo target vector that is updated during each training epoch in a moving average manner to avoid deviations due to noisy predictions and a label corruption matrix which captures inherent relations between inaccurate or false positive labels in the candidate label set and the more accurate or true label.

The implementations described herein may allow for the identification of first party fraud in charge back claims, a more accurate determination of a category associated with a merchant, a determination of a more accurate label for an electronic document or webpage, a determination of a more accurate label or category associated with a product in an e-commerce setting, or the like.

One example implementation provides a system for determining more accurate labels for nodes in a graph. The system includes an electronic computing device. The electronic computing device includes an electronic processor. The electronic processor is configured to receive a graph including a plurality of nodes linked by one or more connections. Each node of the plurality of nodes is unlabeled or associated with a plurality of potential labels and a connection between a first node and a second node represents a relationship between the first node and the second node. The electronic processor is also configured to augment the graph by creating one or more new connections in the graph. For each node of the plurality of nodes included in the augmented graph, the electronic processor is configured to, using a first machine learning model, determine a first vector associated with the node based on the augmented graph, using a second machine learning model, determine a second vector associated with the node based on the augmented graph, and determine the more accurate label for the node based on the first vector and the second vector. Each value included in the first vector is associated with a label and represents a likelihood that the label is a more accurate label and each value included in the second vector is associated with a label and represents a likelihood that the label is the more accurate label. The electronic processor is further configured to send, to a server, a determination of whether to allow or deny a transaction based on one or more more accurately labeled nodes, wherein the server is configured to perform or deny the transaction based on the determination.

Another example implementation provides a method for determining more accurate labels for nodes in a graph. The method includes receiving a graph including a plurality of nodes linked by one or more connections. Each node of the plurality of nodes is unlabeled or associated with a plurality of potential labels and a connection between a first node and a second node represents a relationship between the first node and the second node. The method also includes augmenting the graph by creating one or more new connections in the graph. The method includes, for each node of the plurality of nodes included in the augmented graph, using a first machine learning model, determining a first vector associated with the node based on the augmented graph, using a second machine learning model, determining a second vector associated with the node based on the augmented graph, and determining the more accurate label for the node based on the first vector and the second vector. Each value included in the first vector is associated with a label and represents a likelihood that the label is a more accurate label and each value included in the second vector is associated with a label and represents a likelihood that the label is the more accurate label. The method further includes sending, to a server, a determination of whether to allow or deny a transaction based on one or more more accurately labeled nodes, wherein the server is configured to perform or deny the transaction based on the determination.

Another example implementation provides non-transitory computer-readable medium comprising executable instructions that, when executed by an electronic processor, cause the electronic processor to perform a set of functions. The set of functions includes receiving a graph including a plurality of nodes linked by one or more connections. Each node of the plurality of nodes is unlabeled or associated with a plurality of potential labels and a connection between a first node and a second node represents a relationship between the first node and the second node. The set of functions also includes augmenting the graph by creating one or more new connections in the graph. The set of functions includes, for each node of the plurality of nodes included in the augmented graph, using a first machine learning model, determining a first vector associated with the node based on the augmented graph, using a second machine learning model, determining a second vector associated with the node based on the augmented graph, and determining the more accurate label for the node based on the first vector and the second vector. Each value included in the first vector is associated with a label and represents a likelihood that the label is a more accurate label and each value included in the second vector is associated with a label and represents a likelihood that the label is the more accurate label. The set of functions further includes sending, to a server, a determination of whether to allow or deny a transaction based on one or more more accurately labeled nodes, wherein the server is configured to perform or deny the transaction based on the determination.

BRIEF DESCRIPTION OF THE DRAWINGS

FIG. 7 is a table illustrating the performance of the method of FIG. 4 compared to other methods.

DETAILED DESCRIPTION

One or more implementations are described and illustrated in the following description and accompanying drawings. These implementations are not limited to the specific details provided herein and may be modified in various ways.

Figure 3:
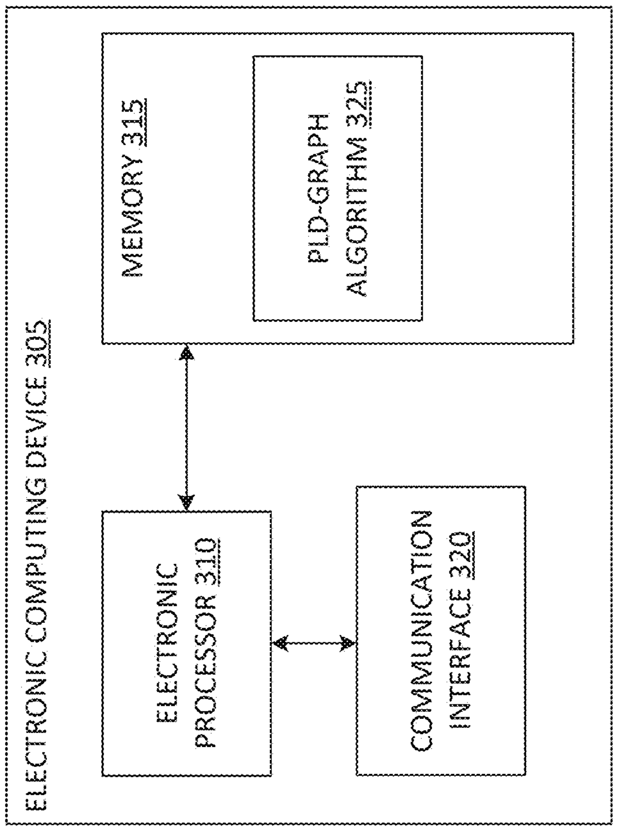
FIG. 3 is an example illustration of a system for determining more accurate labels for nodes included in a graph, according to some implementations.

FIG. 3 is an illustrative example of a system 300 for determining more accurate labels for nodes included in a graph. The system 300 includes an electronic computing device 305. In some implementations, the electronic computing device 305 is a server that is configured to send and receive data via the communication network 820 illustrated in FIG. 8. The electronic computing device 305 includes an electronic processor 310, a memory 315, and a communication interface 320. The communication interface 320 transmits and receives information from devices external to the electronic computing device 305 (for example, the components illustrated in FIG. 8, described in more detail below). The memory 315 is one or more of volatile memory (for example, random access memory ("RAM")) and non-volatile memory (for example, read-only memory ("ROM"), flash memory, magnetic media, optical media, and the like). In some implementations, the memory 315 includes a progressive label disambiguation (PLD-Graph) algorithm 325 for partial label learning on scarcely labeled graphs and when the electronic processor 310 executes the PLD-Graph algorithm 325, the electronic processor 310 performs the functionality described below regarding steps 410-430 of the method 400.

The electronic processor 310 is communicatively coupled to the memory 315 and the communication interface 320. The electronic processor 310 sends and receives information (for example, from the memory 315 and/or the communication interface 320) and processes the information by executing one or more software instructions or modules, capable of being stored in the memory 315, or another non-transitory computer readable medium. The electronic processor 310 is configured to retrieve from the memory 315 and execute, among other things, software for performing the methods described herein.

Figure 4:
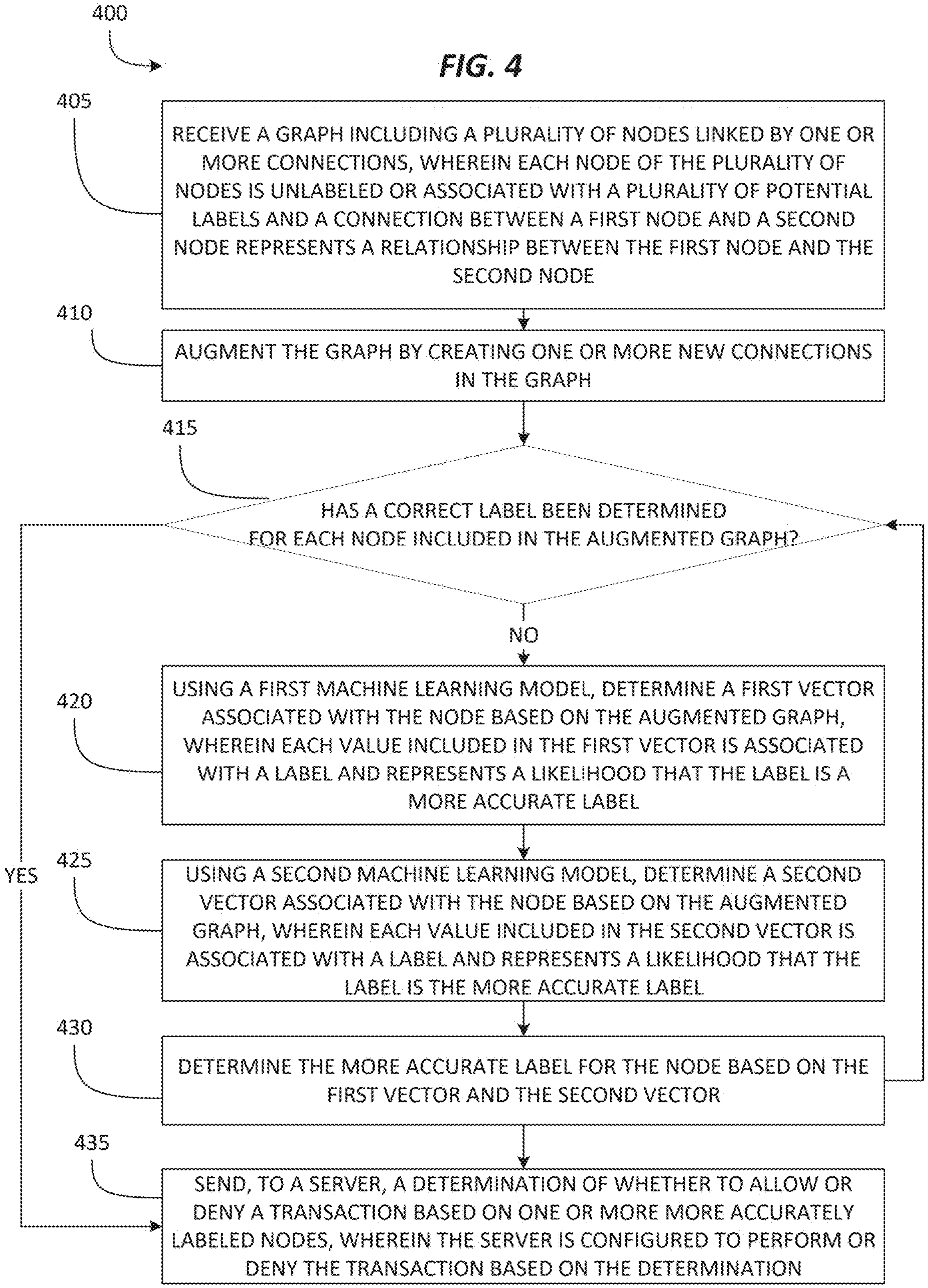
FIG. 4 is an example illustration of a method for determining more accurate labels for nodes included in a graph, according to some implementations.

FIG. 4 is a flowchart of a method 400 for determining more accurate labels for nodes included in a graph. In some implementations, the method 400 begins at step 405, when the electronic processor 310 receives a graph including a plurality of nodes linked by one or more connections. Each node of the plurality of nodes may be unlabeled or associated with a plurality of potential labels or candidate labels and a connection between a first node and a second node may represent a relationship between the first node and the second node. Each node included in the graph may represent an entity (for example, a webpage, an article, a social media profile, a merchant, a card, or the like) and each node may be associated with one or more features that describe the entity. In some implementations, the electronic processor 310 receives the graph via the communication interface 320. In other implementations, the electronic processor 310 receives the graph from the memory 315.

The graph G received by the electronic processor 310 may be defined as a triplet ($\mathcal{V}$, A, X) where $\mathcal{V}=(v_1, \ldots, v_N)$ and represents the set of nodes included in the graph, $A\in\mathbb{R}^{N\times N}$ and represents an adjacency matrix defining the connections between the nodes included in the graph, and $X\in\mathbb{R}^{N\times d}$ and represents a set of d-dimensional node features. In the adjacency matrix A, if nodes v; and v; are connected, $A_{ij}=A_{ji}=1$ and, if nodes $v_i$ and $v_j$ are not connected, $A_{ij}=A_{ji}=0$. The graph G may be a homogeneous graph or a heterogeneous graph such as the graph 900 illustrated in FIG. 9 and described below.

Figure 1:
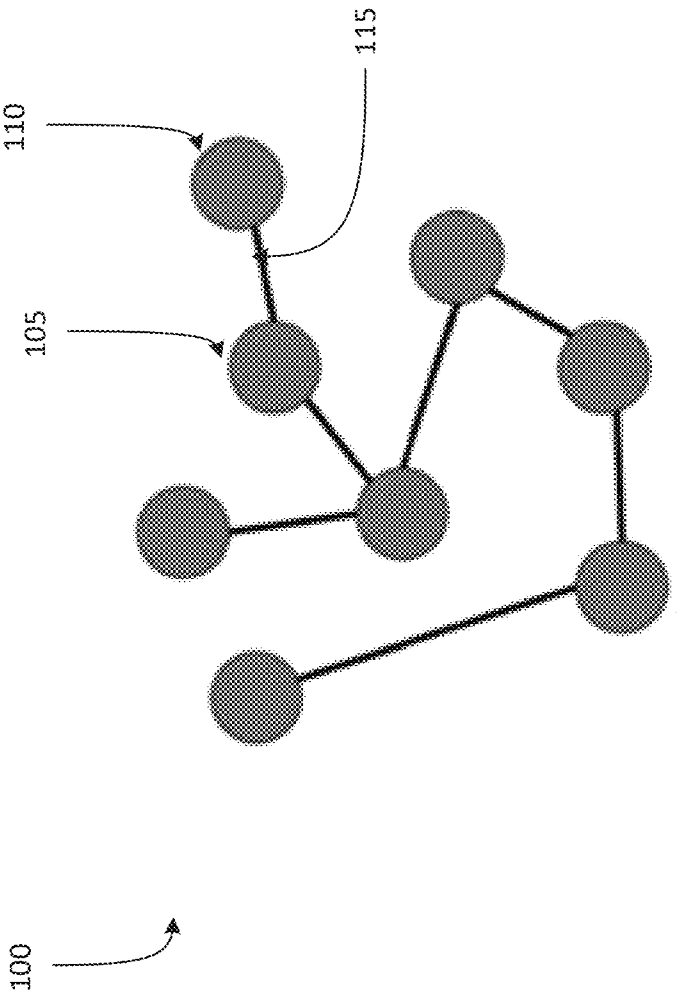
FIG. 1 is an example illustration of a graph data structure.
Figure 2:
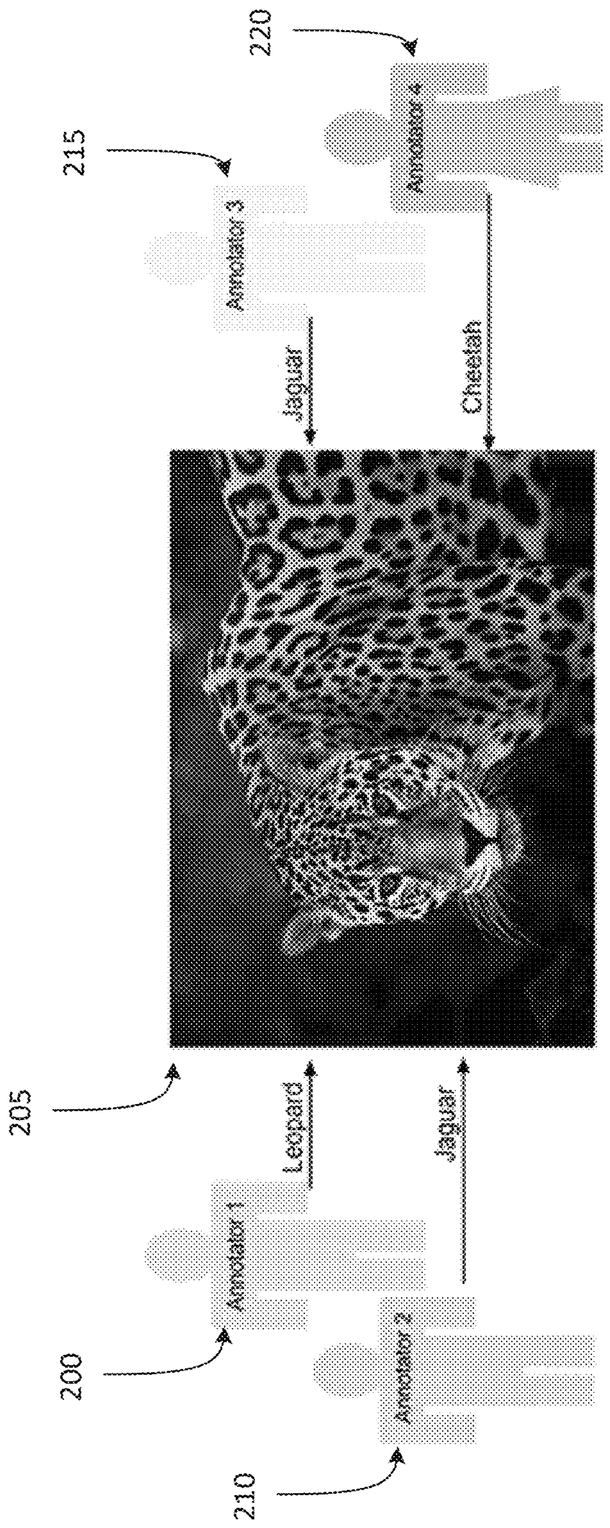
FIG. 2 provides an example illustration of how a node comes to be ambiguously labeled when crowd-sourced annotation is utilized, according to some implementations.

Each node in the graph $\mathcal{G}$ received by the electronic processor 310 belongs to or should be associated with one of the classes or labels in the label set Y={1, 2, . . . , M}. In other words, there is a single correct or true label in the label set Y={1, 2, . . . , M} for each node in the graph $\mathcal{G}$. The graph $\mathcal{G}$ may include a set of partially labeled nodes ($\mathcal{V}_L$) and a set of unlabeled nodes ($\mathcal{V}_U$). A candidate label set is associated with each node included in the set of partially labeled nodes included in the graph $\mathcal{G}$. The candidate label set $y_i\in Y$ contains the correct label ($\hat{y}_i$) alongside other false positive or noisy labels but does not necessarily include every label included in the label set Y. For example, returning to the example illustrated in FIG. 2, the node representing the image of the jaguar 205 may be associated with the a candidate label set $y_i$={jaguar, leopard, cheetah} while the label set Y={jaguar, leopard, cheetah, fox, dog}.

Label noise in the candidate label set can be classified as (1) uniform and (2) competitive. In uniform label noise, the candidate label set is generated by flipping negative labels to false positive labels with a probability $p_{noise}$. In other words, all labels included in the label set that are not the correct label (labels $k\in Y$, where $k\neq\hat{y}_i$), are a part of the candidate label set $y_i$ associated with a node $v_i$ and assigned an equal probability. Returning to the example illustrated in FIG. 2, a candidate label set for the image of the jaguar 205 with uniform label noise may be $y_i$={jaguar, dog, fox}. For competitive label noise, the false positive or noisy labels in the candidate label set depend on the node attributes and the ground truth or correct label. Hence, competitive label noise demonstrates a stronger association with the true or correct label than random labels. The candidate label set for the image of the jaguar 205 with competitive label noise may be $y_i$={jaguar, cheetah, leopard}. Competitive label noise is more likely than uniform label noise in real-world scenarios, as an annotator is more likely to get confused between two similar classes or labels like "cheetah" and "leopard" than they are to get confused between two dissimilar labels like "jaguar" and "fox."

For a node $v_i$ included in the set of partially labeled nodes $\mathcal{V}_L$, a partial label vector is represented as $q^i\in\{0, 1\}^{M\times 1}$ where $$q_j^i = 1$$

if class j is included in the candidate label set $y_i$ for the node $v_i$ and $$q_j^i = 0$$

if class j is not included in the candidate label set $y_i$ for the node $v_i$. For the set of labeled nodes $\mathcal{V}_L$, $Q\in\{0, 1\}^{|\mathcal{V}_L|\times M}$ and represents a partial label matrix.

Hence, the electronic processor 310 receives a undirected graph $\mathcal{G}$ with a set of partially labeled nodes $\mathcal{V}_L$ and the partial label matrix Q. The purpose of the method 400 is to determine correct or more accurate labels for the nodes included in the unlabeled node set $\mathcal{V}_U$ of the graph $\mathcal{G}$ received by the electronic processor 310 as well as identify correct labels or more accurate labels for nodes included in the partially labeled node set $\mathcal{V}_L$ of the graph $\mathcal{G}$ received by the electronic processor 310. The label identified for a node when the method 400 is performed may be more accurate than no labels being associated with the node or multiple labels being associated with the node.

Many real-world graphs that model real-world networks follow the homophily assumption, therefore connected nodes in graphs usually have the same correct label or similar features. However, as described above, many real-world graphs are sparse (in other words, the graphs have many possible links missing). Adding links or connections between labeled and unlabeled nodes in a graph may increase supervision from similar nodes due to efficient message passing. This enhances label disambiguation for partial label learning in sparse graphs with scarce labels.

Therefore, at step 410, the electronic processor 310 augments the graph $\mathcal{G}$ by creating one or more new connections in the graph $\mathcal{G}$. In some implementations, the electronic processor 310 uses a fourth machine learning model to augment the graph $\mathcal{G}$. In some implementations, the fourth machine learning model is a graph convolutional network (GCN). In some implementations, the fourth machine learning model is a two-layer GCN that uses rectified linear unit (ReLU) activation for nonlinearity and has a 64-unit hidden layer.

A GCN is a type of graph neural network (GNN). GNNs are encoder structures that have the capability to process unstructured data in non-Euclidean space. Given the high dimensionality of graphs and the variable number of neighbors for each node included in a graph, GNNs are well-suited for learning complex representations of nodes. For static graphs, graph convolutional networks (GCNs) are the most suitable type of GNN to apply.

In some implementations, the electronic processor 310 is configured to augment the graph $\mathcal{G}$ by creating one or more new connections by, for each node of the plurality of nodes, using or executing a fourth machine learning model, to predict a new connection based on a structure of the graph and features associated with the plurality of nodes. For example, in some implementations, the fourth machine learning model learns, for each node included in the graph, a representation for the node using the features associated with the node and the local graph structure near the node. The fourth machine learning model predicts links between nodes based on the similarity between the representations of the nodes.

In some implementations, the predicted new connection is associated with a likelihood and, when the predicted new connection is associated with a likelihood above a predetermined threshold, the electronic processor 310 creates the new connection in the graph. In some implementations, when there are more than a predetermined number of predicted new connections with a likelihood above a predetermined threshold predicted for a node, the electronic processor 310 creates, in the graph, the predetermined number of new connections. In some implementations, the created new connections are predicted new connections that are associated with higher likelihoods than the other predicted new connections. For example, if there are 7 predicted new connections associated with likelihoods above the predetermined threshold, but the predetermined number of new connections is 5, the electronic processor 310 creates, in the graph, 5 of the 7 predicted new connections and the 5 new connections that are created in the graph are associated with higher likelihoods than the remaining 2 predicted new connections that are not created in the graph. In some implementations, the predetermined number of new connections may be one of 25, 50, and 100. Creating new connections for only the top-K nearest labeled/unlabeled nodes (a predetermined number of predicted new connections associated with the highest likelihoods) for each node makes graph augmentation feasible for large graphs.

In some implementations, node representations are learned using the GCN as set forth in Expression (1).

$$Z = GCN(X, A) \tag{1}$$

In Expression (1), $Z \in \mathbb{R}^{N \times e}$ and denotes the set of e-dimensional node representations $\{z_1, \ldots, z_N\}$, $A \in \mathbb{R}^{N \times N}$ and represents an adjacency matrix defining the connections between the nodes included in the graph, and $X \in \mathbb{R}^{N \times d}$ and represents a set of d-dimensional node features. In some implementations, $\mathbb{R}$ represents a real number space. For example, for nodes $v_i$ and $v_j$, the representations determined by the GCN may be $z_i$ and $z_j$, respectively and a higher similarity between $z_i$ and $z_j$ increases the likelihood that $z_i$ and $z_j$ will be connected in the augmented graph. In some implementations, the electronic processor 310 calculates a likelihood ($w_{ij}$) associated with a predicted new connection between the nodes $v_i$ and v; as set forth in Expression (2).

$$w_{ij} = \max\left(\frac{z_i * z_j}{\|z_i\| \|z_j\|}, 0\right) \tag{2}$$

In some implementations, an updated adjacency matrix $\hat{A}$ is created that includes the new connections in the augmented graph. The creation of the updated adjacency matrix $\hat{A}$ based on the likelihoods associated with the predicted new connections may be represented by Expression (3).

$$\hat{A}_{ij} = \begin{cases} 1 & \text{if } A_{ij} = 1 \\ w_{ij} \text{ if } A_{ij} = 0,\ j \in TopK(i) & \text{and } w_{ij} > \tau \\ 0 & \text{otherwise.} \end{cases} \tag{3}$$

In Expression (3), t is the predetermined threshold used to determine whether a predicted new link is created in the graph and j∈TopK(i) is used to select a predetermined number of the predicted new connections associated with the highest likelihoods (in other words, select nodes in the top-K nearest neighbors). In some implementations, the predetermined threshold t is 0.1.

In some implementations, the electronic processor 310 reconstructs A to train the fourth machine learning model to accurately predict missing links. However, the fourth machine learning model may be biased towards unconnected node pairs because most elements (node pairs) in A are zero for sparse graphs. In some implementations, the electronic processor 310 utilizes negative sampling to mitigate this bias and improve computational efficiency. In some implementations, the electronic processor 310 trains the fourth machine learning model by, for each training epoch, calculating an augmentation loss value for the fourth machine learning model and, based on the augmentation loss value, adjusting the fourth machine learning model. In some implementations, the augmentation loss function is set forth in Expression (4).

$$L_{aug} = \sum_i \left( \sum_{j:A_{ij}>0} (w_{ij} - A_{ij})^2 + N_{neg} E_{j' \sim P_n} (w_{ij'} - A_{ij'})^2 \right) \tag{4}$$

In Expression (4), the first term $(w_{ij} - A_{ij})^2$ relates to matching existing connections in the graph while second term $N_{neg} E_{j' \sim P_n} (w_{ij'} - A_{ij'})^2$ relates to negative sampling. $P_n$ is the uniform distribution of negative samples (for example, nodes not connected to node $v_i$ in the original adjacency matrix A). $N_{neg}$ is the number of negative samples associated with the node $v_i$. In some implementations, the number of negative samples $N_{neg}$ is 100. $\mathcal{L}_{aug}$ is the augmentation loss value.

In some implementations, the fourth machine learning model or the link prediction network is learned or trained jointly with other downstream tasks, allowing it to accurately predict missing links and form optimal augmentations. For example, the fourth machine learning model may be trained using the overall learning objective ($\mathcal{L}_{total}$) described below relation to Expression (14).

At step 415, the electronic processor 310 determines whether a more accurate label has been determined for each node included in the augmented graph. When the augmented graph includes one or more nodes for which a more accurate label has not yet been determined, the electronic processor 310 performs steps 420-430.

At step 420, the electronic processor 310, using a first machine learning model, determines a first vector associated with the node based on the augmented graph. Each value included in the first vector is associated with a label and represents a likelihood that the label is a more accurate label. At step 425, the electronic processor 310, using a second machine learning model, determines a second vector associated with the node based on the augmented graph. Each value included in the second vector is associated with a label and represents a likelihood that the label is the more accurate label. In some implementations, the first machine learning model and the second machine learning model are GCNs. Specifically, the first machine learning model and the second machine learning model may both be a two-layer GCN that uses ReLU activation for nonlinearity and has a 128-unit hidden layer. In some implementations, the first machine learning model and the second machine learning model are initialized with different weights.

At step 430, the electronic processor 310, determines the more accurate label for the node based on the first vector and the second vector. In some implementations, the electronic processor 310 determines the more accurate label by averaging the first vector and the second vector to determine the average vector $p^i$ where $p^i \in [0, 1]^{M \times 1}$. In some implementations, average vector $p^i$ is determined as set forth in Expression (5).

$$p^i = (p^i_{\theta_1} + p^i_{\theta_2})/2 \tag{5}$$

In Expression (5), $$p^i_{\theta_1}$$

is the first vector determined using the first machine learning model with weights $\theta_1$ and $$p^i_{\theta_2}$$

is the second vector determined using the second machine learning model with weights $\theta_2$. Such an ensemble of two GCNs averages out the confidence estimates (values associated with a label) if the first and second machine learning model's outputs are inconsistent with one another. In some implementations, the electronic processor 310 determines the more accurate label for the node to be the label associated with the greatest value included in the average vector. In some implementations, in response to determining that there are two or more greatest values included in the average vector (for example, there is a tie), the electronic processor 310 determines the more accurate label for the node to be the label associated with the greatest value included in the first vector $$p^i_{\theta_1}.$$

After performing step 430, the electronic processor proceeds to step 415 to determine whether a more accurate label been determined for each node included in the augmented graph. When a more accurate label has been determined for each node included in the augmented graph, the electronic processor 310 may, at step 435, send, to a server (for example, the server 815 described below), a determination of whether to allow or deny a transaction based on one or more more accurately labeled nodes. In some implementations, the server is configured to perform or deny the transaction based on the determination. The functionality performed at step 435 is described in further detail below in relation to FIG. 8 and FIG. 9.

Figure 5:
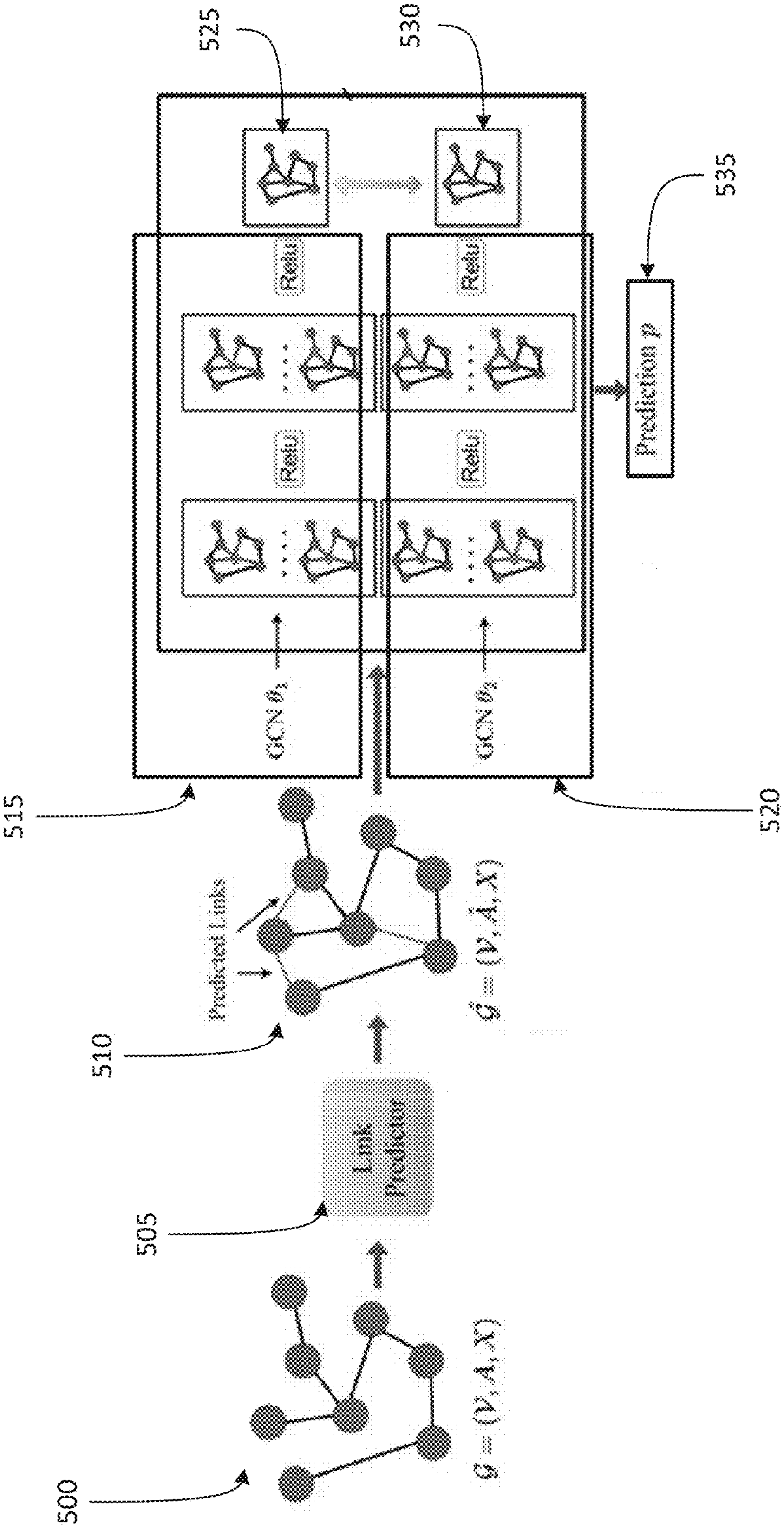
FIG. 5 is a graphical illustration of the method of FIG. 4, according to some implementations.

FIG. 5 is a graphical illustration of the method 400 of FIG. 4. FIG. 5 illustrates a graph 500 being augmented using the calculations described above with respect to step 410. Block 505 represents the calculations used to augment the graph 500. The augmented graph 510 includes new connections or predicted links that are not included in the graph 500. Block 515 represents the first machine learning model and block 520 represents the second machine learning model. The augmented graph 510 is input to the first machine learning model and block 525 represents the first vector associated with a node that is output by the first machine learning model based on the augmented graph 510. The augmented graph 510 is input to the second machine learning model and block 530 represents the second vector associated with the node that is output by the second machine learning model based on the augmented graph 510. Block 535 represents the average vector that is calculated based on the first vector and the second vector.

In some implementations, the electronic processor 310 is configured to train the first machine learning model and the second machine learning model by, determining a classifier loss value based on the first vector, the second vector, and a pseudo target vector, determining a reconstruction loss value based on the average vector and a label corruption matrix, and updating the first machine learning model and the second machine learning model based on the reconstruction loss value and the classifier loss value.

In some implementations, the electronic processor 310 determines the classifier loss value by determining a modified cross entropy loss value and a consistency regularization loss value. In some implementations, the classifier loss value for the node $v_i$ is set forth in Expression (6).

$$\mathcal{L}^i_{class} = \mathcal{L}^i_{target} + \lambda \mathcal{L}^i_{reg} \tag{6}$$

In Expression (6), $$\mathcal{L}^i_{class}$$

is the classifier loss value for the node $v_i$, $$\mathcal{L}^i_{target}$$

is the target loss value for the node $v_i$, $$\mathcal{L}^i_{reg}$$

is the consistency regularization loss value for the node $v_i$, and $\lambda$ is a consistency regularization weight. In some implementations, the consistency regularization weight $\lambda$ is one of 0.1, 0.3, and 0.5.

In some implementations, the target loss value $$\mathcal{L}^i_{target}$$

for the node $v_i$ is set forth in Expression (7).

$$\mathcal{L}^i_{target} = -\Sigma_j\left(s^i_j \log p^i_{\theta_1 j} + s^i_j \log p^i_{\theta_2 j}\right) \tag{7}$$

In Expression (7), $s^i$ is the pseudo-target vector for the node $v_i$ and $s^i \in \mathbb{R}^{M\times 1}$. In some implementations, $\mathbb{R}$ represents a real number space and each value included in the pseudo-target vector $s^i$ is a real number. In some implementations, as represented in Expression (8), when the values include in the pseudo target vector $s^i$ are added together, they equal 1 and, when a label that is included in a label set is not included in the candidate label set associated with the node $v_i$, the value associated with the label in the pseudo target vector $s^i$ is 0. In other words, $$\sum_{j\in y_i} s^i_j = 1; \text{ and } s^i_j = 0, \forall\, j \notin y_i \tag{8}$$

In Expression (8), $$s^i_j$$

represents a value included in the pseudo target vector $s^i$ that is associated with a label or a class j and $y_i$ represents the candidate label set for node $v_i$. In some implementations, initially $$s^i_j = \frac{1}{|y_i|} \forall\, j \in y_i.$$

In other words, initially, an equal confidence value is included in the pseudo target vector $s^i$ for all classes or labels in the candidate label set $y_i$.

However, when an equal confidence value is included in the pseudo target vectors for all classes or labels in the candidate label set $y_i$, the training process suffers from inherent ambiguity, making label disambiguation harder. Therefore, in some implementations, the training of the first machine learning model and the second machine learning model is self-supervised. In each training iteration, the electronic processor 310 determines a normalized average vector $$p^i_{norm}$$

based on the average target vector $p^i$. In some implementations, values in the normalized average vector $$p^i_{norm}$$

that are associated with labels that are not included in the candidate label set $y_i$ for the node $v_i$ are set to 0. In some implementations, the normalized average vector $$p^i_{norm}$$

is set forth in Expression (9).

$$p^i_{norm} = \frac{q^i \cdot p^i}{\|q^i \cdot p^i\|_{L_1}} \tag{9}$$

In Expression (9), · represents element wise multiplication and $L_1$ represents L1-norm.

In some implementations, the electronic processor 310 updates the pseudo-target vector $s^i$ in a moving average manner using the normalized average vector $$p^i_{norm}.$$

For example, the electronic processor 310 may update the pseudo target vector $s^i$ using Expression (10).

$$s^i = \beta s^i + (1-\beta)p^i_{norm},\ \beta \in [0, 1] \tag{10}$$

In Expression (10), β represents a pseudo-target decay factor. In some implementations, the pseudo-target decay factor β is one of 0.8, 0.9, and 0.98. Updating the pseudo target vector allows the electronic processor 310 to tune the first machine learning model and the second machine learning model to more accurate labels based on the ability of the first machine learning model and the second machine learning model to predict more accurate classes. By using dual GCNs with different weight initializations (the first machine learning model and the second machine learning model) and updating the pseudo target vector in a moving average manner, the electronic processor 310 ensures that noisy predictions (which otherwise could potentially offset the pseudo-target vector) are suppressed.

In some implementations, the consistency regularization loss term is determined based on Kullback-Leibler (KL) divergence and is defined in Expression (11).

$$\mathcal{L}^i_{reg} = KL\left(p^i_{\theta_1} \| p^i_{\theta_2}\right) + KL\left(p^i_{\theta_2} \| p^i_{\theta_1}\right) \tag{11}$$

As described above, $$p^i_{\theta_1}$$

in Expression (11) is the first vector determined using the first machine learning model with weights $\theta_1$ and $$p^i_{\theta_2}$$

is the second vector determined using the second machine learning model with weights $\theta_2$. Updating the first machine learning model and the second machine learning model using the reconstruction loss value allows the first machine learning model and the second machine learning model to teach, and learn from, each other.

As described above, in real-world scenarios, competitive label noise is more prevalent than uniform noise. While uniform label noise can be tackled using the homophily property of structured graph data, a solution is required for competitive label noise. To address the issue of competitive label noise, the electronic processor 310 learns the label corruption matrix R, where $R \in \mathbb{R}^{M \times M}$ for the given candidate label sets of nodes in $V_L$. Element $r_{ij}$ in the label corruption matrix R indicates the probability of jth label being present in the candidate label set for a node with true or more accurate label i. In some implementations, to obtain the label corruption matrix R, the electronic processor 310 executes a transformation network T with the partial label matrix Q as input. In other words, R=T (Q). In some implementations, the transformation network T is a two-layer neural network. In some implementations, the transformation network T is trained based on partial label vector reconstruction loss. More specifically, the transformation network T is trained based on whether the partial label vector $$q^i_{rec}$$

for the node $v_i$ can be reconstructed from corruption matrix R and average vector $p^i$ as set forth in Expression (12).

$$q^i_{rec} = Rp^i \quad (12)$$

In some implementations, the reconstruction loss value for the partial label vector $q^i$ of the node $v_i$ is described in Expression (13).

$$\mathcal{L}^i_{rec} = KL(q^i_{rec} \| q^{\sim i}) + KL(q^{\sim i} \| q^i_{rec}) \quad (13)$$

In Expression (13), $q^{\sim i}$ is L1-normalized partial label vector $q^i$ and $$q^i_{rec}$$

is the reconstructed partial label vector for $v_i$. The reconstruction loss value allows the electronic processor 310 to identify the associations between a true or more accurate label and a candidate label set for a node, and thus guide the classifier loss to enhance label disambiguation.

In some implementations, by combining the augmentation loss value determined in Expression (4), the classifier loss value $$\mathcal{L}^i_{class}$$

determined in Expression (6), and reconstruction loss value $$\mathcal{L}^i_{rec}$$

determined in expression (13), the electronic processor 310 determines the overall learning objective or total loss value $\mathcal{L}_{total}$. The total loss value $\mathcal{L}_{total}$ may be described as set forth in Expression (14).

$$\mathcal{L}_{total} = \frac{1}{|V_L|}\sum_{i \in V_L}\left(\mathcal{L}^i_{class} + \gamma\mathcal{L}^i_{rec}\right) + \alpha\mathcal{L}_{aug} \quad (14)$$

In Expression (14), α is 0.3 and γ represents a partial label reconstruction loss weight. In some implementations, the partial label reconstruction loss weight γ is one of 0.5, 1, 1.5, and 2. In some implementations, the electronic processor 310 updates the fourth machine learning model, the first machine learning model, and the second machine learning model based on the total loss value $\mathcal{L}_{total}$. In some implementations, the electronic processor 310 uses a gradient descent algorithm, a backpropagation algorithm, or the like to update the fourth machine learning model, the first machine learning model, and the second machine learning model.

Figure 6:
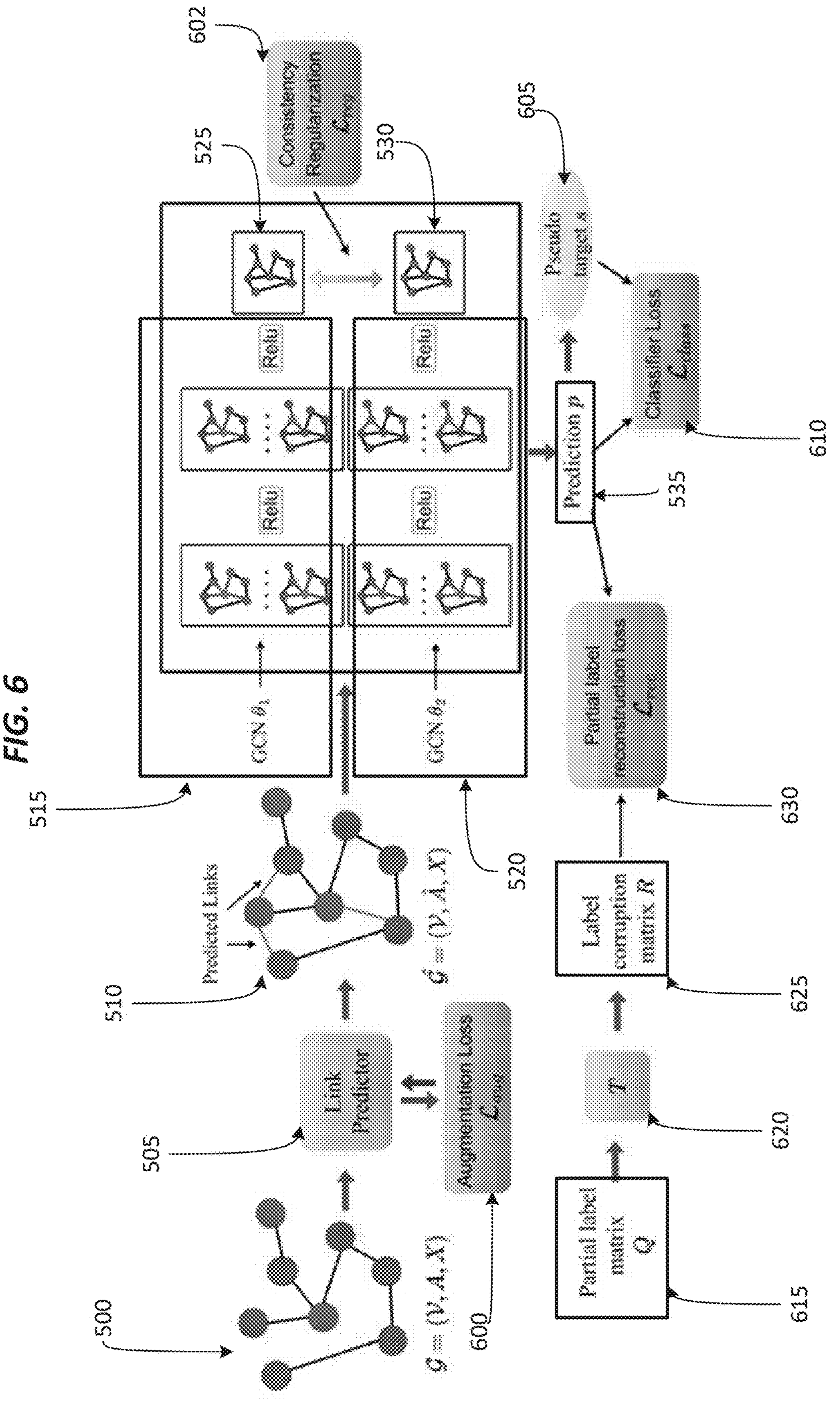
FIG. 6 is a graphical illustration of a method for training one or more machine learning models used to perform the method of FIG. 4, according to some implementations.

FIG. 6 is a graphical illustration of a method for training one or more machine learning models used to perform the method of FIG. 4. Block 600 illustrates the calculation of the augmentation loss value. Block 602 represents the calculations performed by the electronic processor 310 to determine the consistency regularization loss value based on the first vector represented by block 525 and the second vector represented by block 530. Oval 605 illustrates the pseudo target vector. Block 610 represents the calculations performed by the electronic processor 310 to determine the classifier loss value using the average vector represented by block 535 and the pseudo target vector represented by oval 605. Block 615 represents the partial label matrix. Block 620 represents the transformation network that, when given the partial label matrix represented by block 615 as input, outputs the label corruption matrix represented by block 625. Block 630 represents the calculations performed by the electronic processor 310 to determine the partial label reconstruction loss value based on the label corruption matrix represented by block 625.

FIG. 7 is a table 700 illustrating the performance of the method 400 of FIG. 4 (or the PLD-Graph algorithm 325) compared to other methods. The table 700 illustrates the performance of the PLD-Graph algorithm compared to other algorithms on three datasets. The attributes of the three data sets (Cora, Citeseer, and Wiki-CS) are illustrated in the following table:

TABLE 1

Dataset Statistics

| Name | Nodes | Edges | Features | Classes |
|---|---|---|---|---|
| Cora | 2485 | 5069 | 1433 | 7 |
| Citeseer | 2110 | 3688 | 3703 | 6 |
| Wiki-CS | 11701 | 216123 | 300 | 10 |

The nodes column in table 1 includes the number of nodes included in each dataset, the edges column includes the number of connections between nodes included in the dataset, the features column includes the number of features associated with the nodes, and the classes column includes the number of labels included in the label set associated with the dataset.

The algorithms whose performance the performance of the PLD-Graph algorithm is compared to include a partial label-k nearest neighbors (PL-KNN) algorithm, deep graph matching for partial label learning (DGAP) algorithm, progressive identification (PRODEN) algorithm, class activation value learning (CAVL) algorithm, and a fully supervised GCN algorithm.

The table 700 illustrates the performance of the PLD-Graph algorithm relative to other methods or algorithms for different amounts of uniform label noise. The table 700 also illustrates the performance of the PLD-Graph algorithm relative to other methods or algorithms for different amounts of competitive label noise (numbers of competitive labels or classes included in the candidate label set associated with a node). The numbers included in the table 700 illustrate the mean performance (within +/−a standard deviation) of an algorithm in labelling or classifying nodes in a dataset given an amount of uniform or competitive label noise (a level of ambiguity). Bolded numbers highlight the best performance labelling or classifying nodes in a dataset given an amount of uniform or competitive label noise.

The table 700 demonstrates that the PLD-Graph algorithm is highly effective in tackling partial label learning in graphs in both label noise scenarios (uniform and competitive) and with varying levels of noise as well as across graph datasets with variable size, variable feature dimensions, and variable numbers of connected nodes. The proposed PLD-Graph algorithm described herein significantly improves node classification tasks compared to the state-of-the-art PLL methods in tabular and vision domains. The performance of the PLD-Graph algorithm even nearly matches the performance of its fully supervised GCN counterpart in certain label noise settings.

Figure 8:
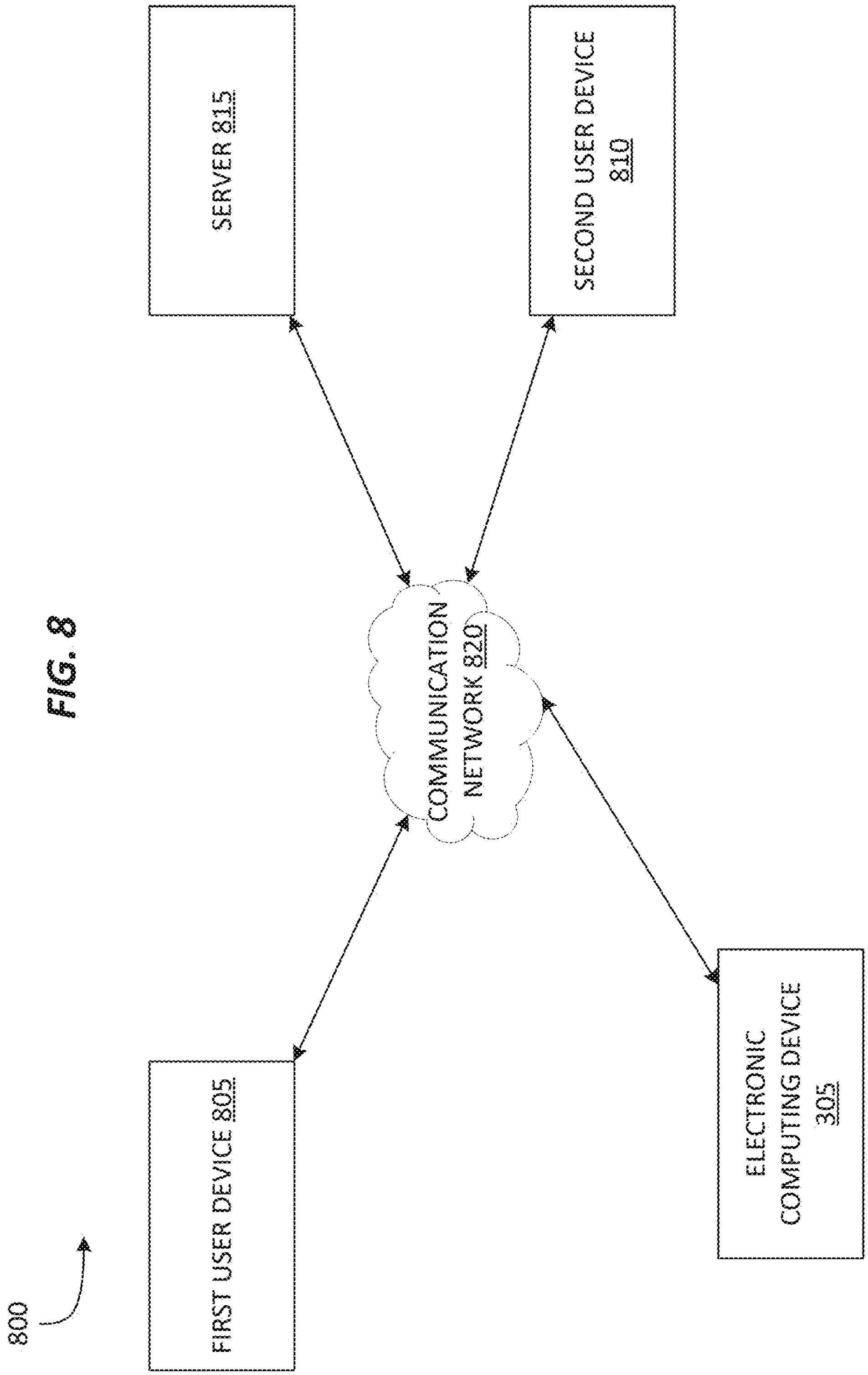
FIG. 8 is an example of a system that applies the method of FIG. 4 to label chargeback claims and merchants.

FIG. 8 is an example of a system 800 that applies the method of FIG. 4 to label chargeback claims and merchants. The system 800 includes a first user device 805, a second user device 810, a server 815, and the electronic computing device 305. In some implementations, the first user device 805, the second user device 810, the server 815, and the electronic computing device 305 communicate with one another via the communication network 820. The communication network 820 may be an electronic communication network including wired connections, wireless connections, or both. The communication network 820 may be implemented using a variety of one or more networks including, but not limited to, a wide area network, a local area network, and a near-field network.

In some implementations, the first user device 805 may be associated with a user who is a cardholder (for example, in possession of a credit card). In some implementations, the second user device 810 is associated with a merchant (for example, a provider of goods and services). In some implementations, the server 815 is configured to manage an online resource and is associated with, for example, a financial institution such as a bank. In some implementations, the electronic computing device 305 is associated with an institution that issued the card that the cardholder associated with the first user device 805 holds. It should be understood that the system 800 may include multiple first user devices each associated with the same cardholder or a different cardholder, multiple second user devices each associated with the same merchant or a different merchant, and multiple servers each associated with a different financial institution or the same financial institution.

In some implementations, the cardholder may make a chargeback claim (request that a transaction be performed or processed). A chargeback claim may be made when for example, a cardholder disputes a previous transaction made with a merchant using a credit card. When the cardholder makes a chargeback claim, the first user device 805 may send, to the server 815, a request for a reimbursement for funds associated with the disputed previous transaction or a request relieve the cardholder of their debt or obligation to pay back the amount charged to the credit card for the disputed previous transaction. The server 815 may send to the electronic computing device 305 a request for a determination of whether the chargeback claim should be denied or processed.

To determine whether to process or deny the chargeback claim, the electronic processor 310, may determine whether the chargeback claim is associated with first party fraud, third party fraud, or a technical error. First party fraud may be, for example, when a cardholder makes a chargeback claim even though the cardholder made the purchase or disputed transaction and received the goods or services associated with the purchase. Third party fraud may occur when, for example, a party other than the cardholder made a purchase using the card. A technical error may occur when, for example, an incorrect amount was charged to the card, goods or services associated with the purchase were not received, and the like.

In the case that a chargeback claim is associated with third party fraud or technical error, the electronic processor 310 may send, to the server 815, a determination that the chargeback claim or transaction should be allowed, a command to process the transaction or chargeback claim, or both. When the server 815 receives the determination that the chargeback claim or transaction should be allowed, the command to process the transaction or chargeback claim, or both, the server 815 may reimburse the funds or relieve the cardholder of their debt associated with the disputed previous transaction. In the case that a chargeback claim is associated with first party fraud, the electronic processor 310 may send, to the server 815, a determination that the chargeback claim or transaction should be denied, a command to deny the transaction or chargeback claim, or both. In some implementations, when the server 815 receives the determination that the chargeback claim or transaction should be denied, the command to deny the transaction or chargeback claim, or both, the server 815 does not reimburse the funds associated with the disputed transaction or relieve the cardholder of their debt associated with the disputed previous transaction. In some implementations, when the server 815 receives the determination that the chargeback claim or transaction should be denied, the command to deny the transaction or chargeback claim, or both, the server 815 sends a message to the first user device 805 that the chargeback claim has been denied.

Figure 9:
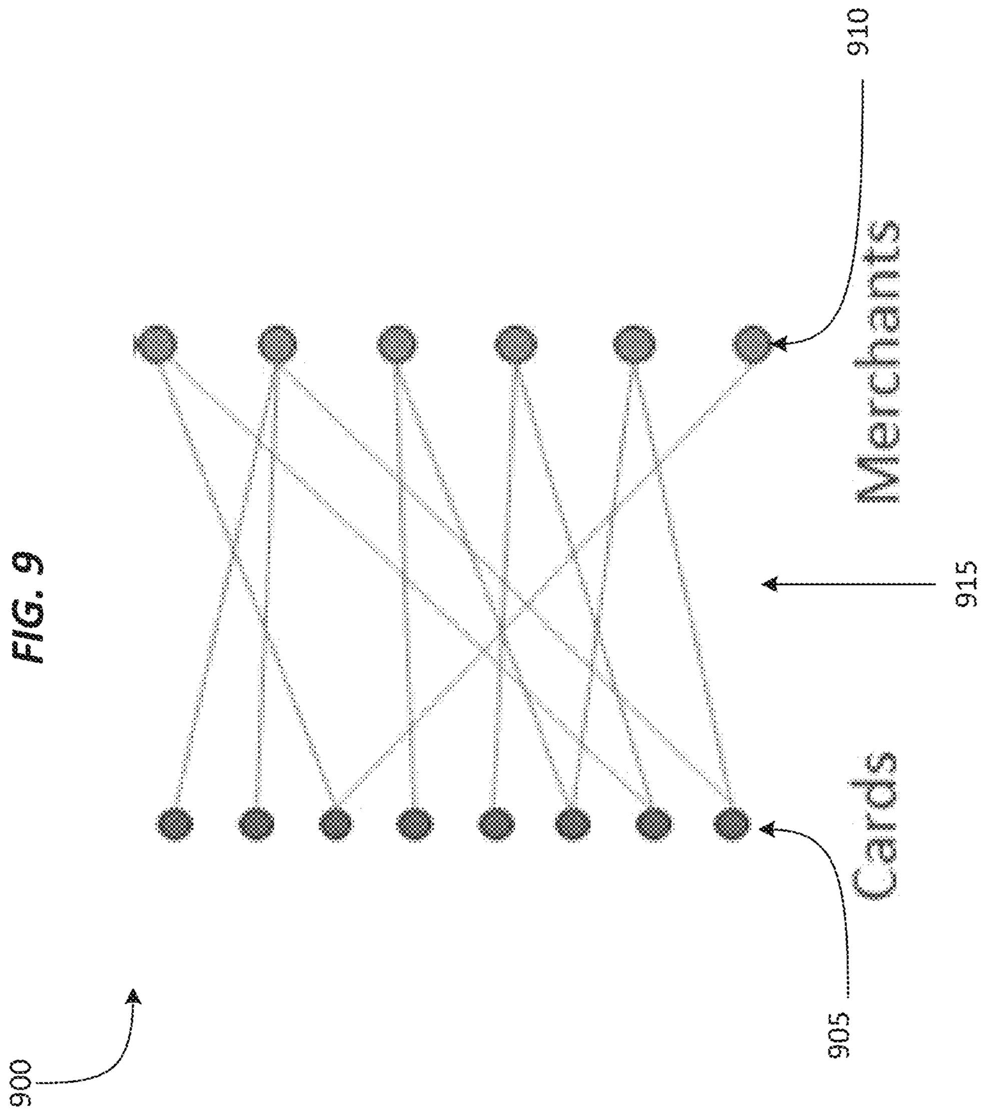
FIG. 9 is an example graph including a plurality of nodes, each associated with a merchant or a card associated with a chargeback claim.

To determine the more accurate label (first party fraud, third party fraud, and technical error) for chargeback claims, the electronic processor 310 may execute the PLD-Graph algorithm 325 to label the nodes included in the graph 900 illustrated in FIG. 9. The graph 900 includes a plurality of nodes. Each node included in a first group of one or more nodes 905 of the plurality of nodes is associated with a credit card for which a chargeback claim has been made and has a first label set or a first plurality of potential labels that includes "first party fraud," "third party fraud," and "technical error." Each node included in a second group of one or more nodes 910 of the plurality of nodes is associated with a merchant and has a second label set or a second plurality of potential labels that includes one of a plurality of merchant category codes (MCCs). The MCCs associated with a merchant may be updated overtime as new information regarding a merchant is received, causing a single merchant to become associated with multiple MCCs. In some implementations, each connection of the plurality of connections 915 included in the graph 900 represents a transaction made between a merchant and a user (for example, the cardholder or a third party) using the card.

In some implementations the electronic processor 310 is configured train a third machine learning model with training data including the more accurately labeled nodes determined when the electronic processor 310 executes the method 400. For example, the third machine learning model may be trained to determine whether a chargeback claim is associated with first party fraud, third party fraud, or technical error using the more accurately labeled first group of one or more nodes. When the electronic processor 310 receives, from the server 815, a request for a determination of whether a chargeback claim should be denied or processed, the electronic processor 310 may execute the third machine learning software to determine whether the chargeback claim is associated with first party fraud, third party fraud, or technical error.

In another example, the third machine learning model may be trained to determine an MCC associated with a merchant using the more accurately labeled second group of one or more nodes. In some implementations, determining a more accurate MCC associated with a merchant, may aid the electronic processor 310 in determining fraudulent transactions because merchants associated with a first MCC may be more likely to be involved in fraudulent transactions than merchants associated with a second MCC. When, for example, the electronic processor 310 receives from the server 815, a request to determine whether a transaction between a merchant associated with the second user device 810 and a cardholder associated with the first user device 805 is associated with fraud, the electronic processor 310 may execute the third machine learning software to determine the MCC associated with the merchant and use the MCC associated with the merchant to determine whether to determine whether the transaction is fraudulent. The transaction may be, for example, a push payment where limited information regarding the merchant is available. When the electronic processor 310 determines that the transaction such as a push payment is associated with fraud, the electronic processor may send to the server 815 a determination that the transaction should be denied, a command to deny the transaction, or both. In some implementations, when the server 815 receives the determination that the transaction should be denied, the command to deny the transaction, or both, the server 815 does not perform the transaction, for example, does not transfer funds from an account associated with the cardholder to an account associated with the merchant. In some implementations, the server 815 may send to the first user device 805, the second user device 810, or both, a message that the transaction has been denied.

When the electronic processor 310 determines that a transaction such as a push payment is not associated with fraud, the electronic processor 310 may send to the server 815 a determination that the transaction should be allowed, a command to process the transaction, or both. In some implementations, when the server 815 receives the determination that the transaction should be allowed, the command to process the transaction, or both, the server 815 performs the transaction by, for example, transferring funds from an account associated with the cardholder to an account associated with the merchant.

It should be understood that other implementations may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some implementations described herein may include one or more electronic processors configured to perform the described functionality by executing instructions stored in non-transitory, computer-readable medium. Similarly, implementations described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for determining more accurate labels for nodes in a graph, the system comprising:
- an electronic computing device, the electronic computing device including:
  - an electronic processor, the electronic processor is configured to:
    - train a first machine learning model and a second machine learning model, wherein the first machine learning model and the second machine learning model are initialized with different model weights;
    - receive a graph including a plurality of nodes linked by one or more connections, wherein
      - each node of the plurality of nodes represents a card with a chargeback claim or represents a merchant,
      - each node of the plurality of nodes is unlabeled or associated with a plurality of potential labels, and a connection between a first node and a second node represents a transaction made between a merchant and a user using a card with a chargeback claim;

augment the graph by creating one or more new connections in the graph;

for each node of the plurality of nodes included in the augmented graph:

using the first machine learning model, determine a first vector associated with the node based on the augmented graph, wherein each value included in the first vector is associated with a label and represents a likelihood that the label is a more accurate label, when the node represents a card with a chargeback claim, each label associated with a value included in the first vector is third party fraud, first party fraud, or technical error, and when the node represents a merchant, each label associated with a value included in the first vector is a merchant category code;

using the second machine learning model, determine a second vector associated with the node based on the augmented graph, wherein each value included in the second vector is associated with a label and represents a likelihood that the label is the more accurate label, when the node represents a card with a chargeback claim, each label associated with a value included in the second vector is third party fraud, first party fraud, or technical error, and when the node represents a merchant, each label associated with a value included in the second vector is a merchant category code; and determine the more accurate label for the node based on the first vector and the second vector; and send, to a server, a determination of whether to allow or deny a transaction based on one or more more accurately labeled nodes, wherein the server is configured to perform or deny the transaction based on the determination, wherein, to train the first machine learning model and the second machine learning model, the electronic processor is further configured to determine a consistency regulation loss value based on the first vector and the second vector.

2. The system according to claim 1, wherein the electronic processor is configured to train a third machine learning model with training data, wherein the training data includes the labeled nodes.

3. The system according to claim 1, wherein the electronic processor is configured to augment the graph by creating one or more new connections by:

for each node of the plurality of nodes:

using a fourth machine learning model, predicting a new connection based on a structure of the graph and features associated with the plurality of nodes, wherein the predicted new connection is associated with a likelihood; and when the predicted new connection is associated with a likelihood above a predetermined threshold, create the new connection in the graph.

4. The system according to claim 3, wherein the electronic processor is further configured to train the fourth machine learning model by:

determining an augmentation loss value for the fourth machine learning model; and based on the augmentation loss value, adjusting the fourth machine learning model.

5. The system according to claim 1, wherein the electronic processor is configured to augment the graph by creating one or more new connections by:

when there are more than a predetermined number of predicted new connections with a likelihood above a predetermined threshold predicted for a node, creating, in the graph, the predetermined number of new connections, wherein the created new connections are predicted new connections that are associated with higher likelihoods.

6. The system according to claim 1, wherein the electronic processor is configured to determine the more accurate label for the node based on the first vector and the second vector by:

averaging the first vector and the second vector to determine an average vector; and determining a label associated with a greatest value included in the average vector to be the more accurate label for the node.

7. The system according to claim 6, wherein the electronic processor is configured to train the first machine learning model and the second machine learning model by:

determining a classifier loss value based on the first vector, the second vector, and a pseudo target vector;

determining a reconstruction loss value based on the average vector and a label corruption matrix; and updating the first machine learning model and the second machine learning model based on the reconstruction loss value and the classifier loss value.

8. The system according to claim 6, wherein the electronic processor is configured to train the first machine learning model, the second machine learning model, and a fourth machine learning model by:

determining an augmentation loss value for the fourth machine learning model;

determining a classifier loss value based on the first vector, the second vector, and a pseudo target vector;

determining a reconstruction loss value based on the average vector and a label corruption matrix;

determining a total loss value based on the augmentation loss value, the classifier loss value, and the reconstruction loss value; and updating the first machine learning model, the second machine learning model, and the fourth machine learning model based on the total loss value.

9. A method for determining more accurate labels for nodes in a graph, the method comprising:

training, with an electronic processor, a first machine learning model and a second machine learning model, wherein the first machine learning model and the second machine learning model are initialized with different model weights;

receiving, with the electronic processor, a graph including a plurality of nodes linked by one or more connections, wherein each node of the plurality of nodes represents a card with a chargeback claim or represents a merchant, each node of the plurality of nodes is unlabeled or associated with a plurality of potential labels, and a connection between a first node and a second node represents a transaction made between a merchant and a user using a card with a chargeback claim;

augmenting the graph by creating one or more new connections in the graph;

for each node of the plurality of nodes included in the augmented graph:

using the first machine learning model, determining a first vector associated with the node based on the augmented graph, wherein each value included in the first vector is associated with a label and represents a likelihood that the label is a more accurate label, when the node represents a card with a chargeback claim, each label associated with a value included in the first vector is third party fraud, first party fraud, or technical error, and when the node represents a merchant, each label associated with a value included in the first vector is a merchant category code;

using the second machine learning model, determining a second vector associated with the node based on the augmented graph, wherein each value included in the second vector is associated with a label and represents a likelihood that the label is the more accurate label, when the node represents a card with a chargeback claim, each label associated with a value included in the second vector is third party fraud, first party fraud, or technical error, and when the node represents a merchant, each label associated with a value included in the second vector is a merchant category code; and determining the more accurate label for the node based on the first vector and the second vector; and sending, with the electronic processor, a determination of whether to allow or deny a transaction based on one or more more accurately labeled nodes to a server, wherein the server is configured to perform or deny the transaction based on the determination, wherein training the first machine learning model and the second machine learning model further includes determining a consistency regulation loss value based on the first vector and the second vector.

10. The method according to claim 9, wherein determining the more accurate label for the node based on the first vector and the second vector includes:

averaging the first vector and the second vector to determine an average vector; and determining a label associated with a greatest value included in the average vector to be the more accurate label for the node.

11. A non-transitory computer-readable medium comprising executable instructions that, when executed by an electronic processor, cause the electronic processor to perform a set of functions comprising:

training a first machine learning model and a second machine learning model, wherein the first machine learning model and the second machine learning model are initialized with different model weights;

receiving a graph including a plurality of nodes linked by one or more connections, wherein each node of the plurality of nodes represents a card with a chargeback claim or represents a merchant, each node of the plurality of nodes is unlabeled or associated with a plurality of potential labels, and a connection between a first node and a second node represents a transaction made between a merchant and a user using a card with a chargeback claim;

augmenting the graph by creating one or more new connections in the graph;

for each node of the plurality of nodes included in the augmented graph:

using the first machine learning model, determining a first vector associated with the node based on the augmented graph, wherein each value included in the first vector is associated with a label and represents a likelihood that the label is a more accurate label, when the node represents a card with a chargeback claim, each label associated with a value included in the first vector is third party fraud, first party fraud, or technical error, and when the node represents a merchant, each label associated with a value included in the first vector is a merchant category code;

using the second machine learning model, determining a second vector associated with the node based on the augmented graph, wherein each value included in the second vector is associated with a label and represents a likelihood that the label is the more accurate label, when the node represents a card with a chargeback claim, each label associated with a value included in the second vector is third party fraud, first party fraud, or technical error, and when the node represents a merchant, each label associated with a value included in the second vector is a merchant category code; and determining the more accurate label for the node based on the first vector and the second vector; and sending, to a server, a determination of whether to allow or deny a transaction based on one or more more accurately labeled nodes, wherein the server is configured to perform or deny the transaction based on the determination, wherein training the first machine learning model and the second machine learning model further includes determining a consistency regulation loss value based on the first vector and the second vector.

12. The non-transitory computer-readable medium according to claim 11, wherein determining the more accurate label for the node based on the first vector and the second vector includes:

averaging the first vector and the second vector to determine an average vector; and determining a label associated with a greatest value included in the average vector to be the more accurate label for the node.

* * * * *